June 11, 1929.  C. W. SMITH  1,716,467
WINDSHIELD PROTECTOR
Filed Oct. 22, 1926  2 Sheets-Sheet 1

Charles W. Smith
INVENTOR

BY Victor J. Evans
ATTORNEY

WITNESS:

June 11, 1929.   C. W. SMITH   1,716,467
WINDSHIELD PROTECTOR
Filed Oct. 22, 1926   2 Sheets-Sheet 2
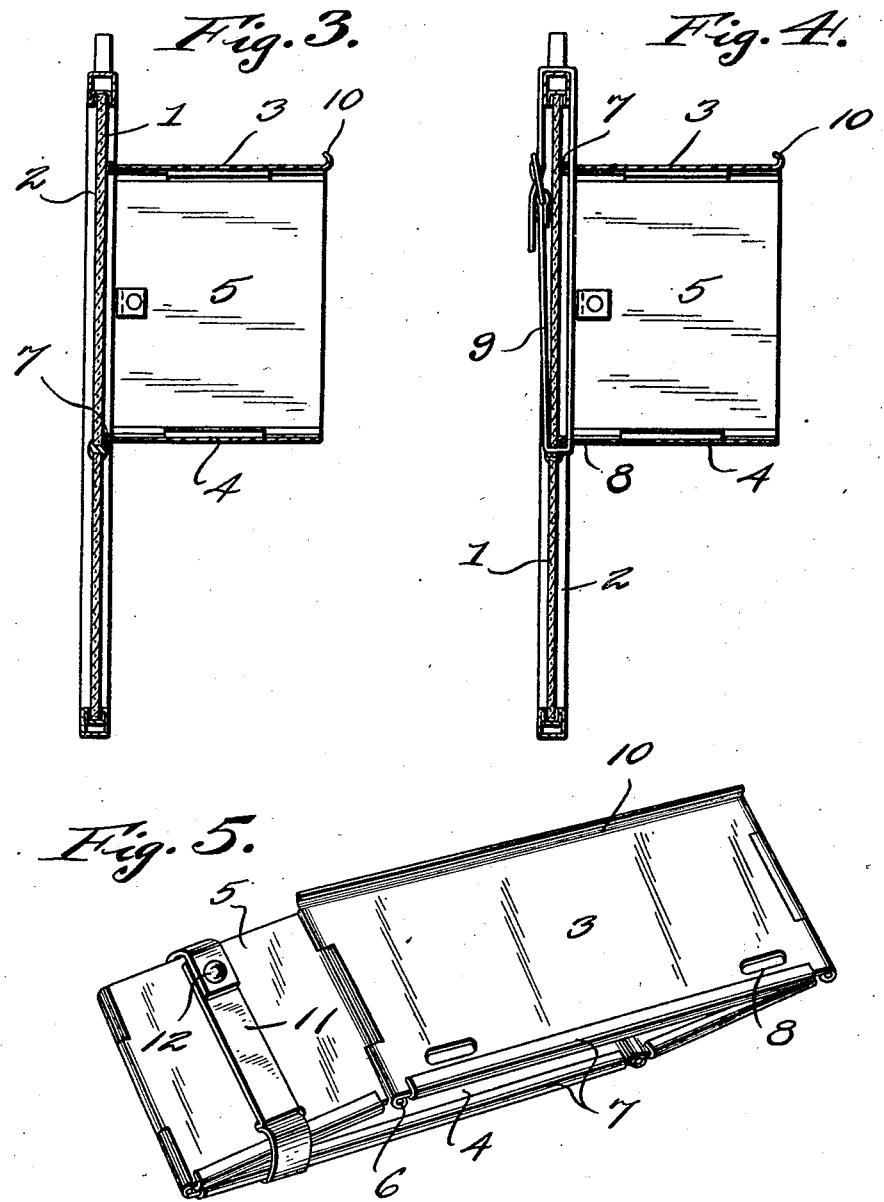
Charles W. Smith
INVENTOR
BY Victor J. Evans
ATTORNEY
WITNESS:

Patented June 11, 1929.

1,716,467

UNITED STATES PATENT OFFICE.

CHARLES W. SMITH, OF VALLEJO, CALIFORNIA.

WINDSHIELD PROTECTOR.

Application filed October 22, 1926. Serial No. 143,445.

My present invention has reference to a device for preventing the accumulation of rain, sleet or snow upon the windshield of an automobile or like vehicle, so that the driver will have perfect vision of the road conditions ahead, regardless of inclement weather.

A further object is the provision of a device for this purpose which is of a foldable or collapsible nature but which may be readily set up to produce a substantially rectangular frame, the said frame having compressible elements on the edges thereof that contact with the windshield, and being provided with means for effectively clamping the same on the windshield, one or all of such clamping means being also employed for holding the device in its folded or collapsed condition, and when in such condition the protector is folded to produce a comparatively small package which may be conveniently carried in the automobile.

To the attainment of the above broadly stated objects and others which will present themselves as the nature of the invention is better understood, the improvement further resides in the novel features of construction, combination and operative association of parts, a satisfactory embodiment of which is disclosed by the accompanying drawings.

In the drawings:

Figure 3 is a sectional view approximately on the line 3—3 of Figure 1.

Figure 4 is a sectional view approximately on the line 4—4 of Figure 1.

Figure 5 is a perspective view of the device in its folded or collapsed condition.

Figure 1:
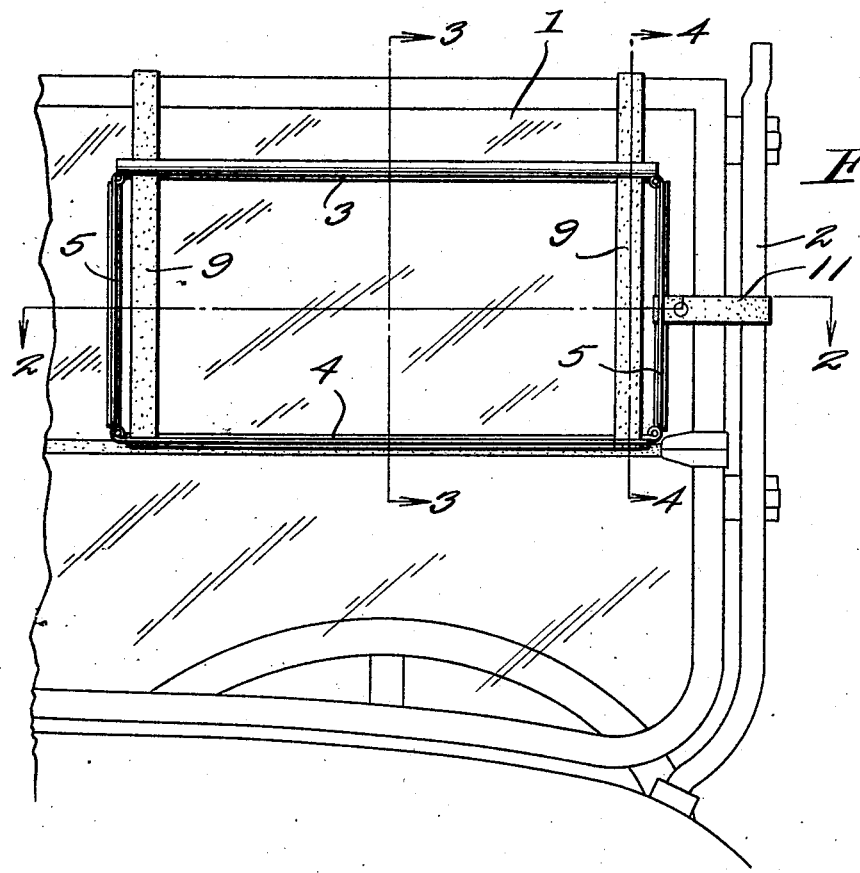
Figure 1 is a front elevation of a sufficient portion of an automobile to illustrate the application of my improvement.
Figure 2:
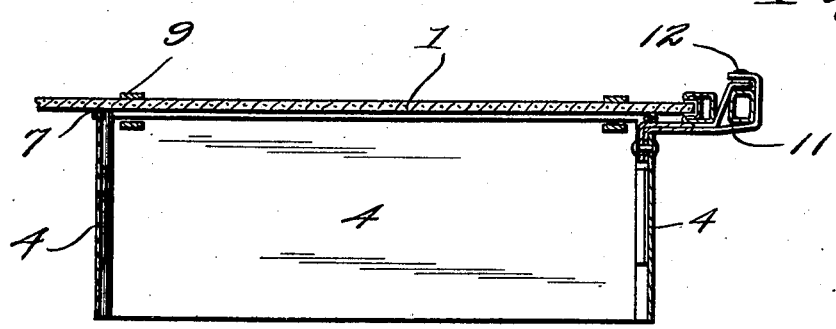
Figure 2 is a sectional view on the line 2—2 of Figure 1.

Referring now to the drawings in detail, the numeral 1 designates the windshield of an automobile, and 2 one of the supporting frames for the windshield.

In carrying out my invention I make use of a metal frame of rectangular formation when in set-up condition. The frame may be of any desired length and width, and comprises a pair of somewhat elongated plates that constitute the upper member 3 and the lower member 4 of the frame. The side members of the frame are indicated by the numerals 5. The side members and the top and bottom members have their edges provided with interengaging knuckles and through these knuckles there are passed pivots 6. Thus the elements constituting the frame are hingedly associated and thus the frame may be collapsed to provide a comparatively small bundle as disclosed by Figure 5 of the drawings. The elements constituting the frame have on their inner edges compressible facings 7, respectively, and the upper and lower plates 3 and 4, adjacent to their edges and also adjacent to their corners are provided with elongated openings 8, respectively. There is designed to be passed through the openings 8 of the frame straps 9, the said straps being arranged over the top and bottom of the windshield and each having one of its ends provided with a buckle to be engaged by the second end of the said strap.

As far as the description has progressed it will be seen that the device may be easily and securely attached to the windshield and that the compressible edges 7 of the frame will prevent the entrance of light obstructing elements into the said frame. The frame, of course, extends a considerable distance outward from the windshield so that the glass face of the windshield will not be affected by light obscuring elements and consequently the driver will have full vision of conditions ahead of his vehicle so that the same can be driven with perfect safety.

The outer edge of the top plate 3 of the frame is formed with a longitudinal rounded portion providing the same with a gutter 10 whereby moisture accumulating on the top of the protector will be directed over the sides thereof. The gutter projects beyond the frame 5 and is preferably but slightly inclined downwardly from the center to the ends thereof.

Fixedly secured to the inner face of one of the side plates 5 of the frame and passing through a slot or opening therein there are the ends of elastic elements 11 respectively. These elements are designed to be arranged around one of the frame members 2, there being coengaging fastening elements 12 at the ends of the said elastic members. This, together with the straps 9 will effectively hold the frame in tight contact with the glass of the windshield, and the elastic elements or straps 11 are designed to be wound around the frame for holding the parts thereof in folded or collapsed condition as illustrated by Figure 5 of the drawings. Also the straps 9 may be removed and fastened around the folded device.

The simplicity of my construction and the advantages thereof will, it is thought, be perfectly apparent to those skilled in the art to which such invention relates, when the foregoing description has been carefully read in connection with the accompanying drawings, it being, of course, understood that I do not wish to be limited to the precise details herein set forth and, therefore hold myself entitled to make such changes therefrom as fairly fall within the scope of what I claim.

Having described the invention, I claim:—

A protector for windshields or like glass panels, comprising a substantially rectangular hood made up of hingedly associated sections, compressible facings on the inner edges of the sections, straps passing through the top and bottom sections of the hood and arranged around the windshield for holding the said hood on said windshield, elastic elements secured to one side of the hood and designed to be arranged around the support for the windshield or the like and to have their ends fastened together for sustaining the frame from longitudinal movement in one direction on the windshield and said last mentioned straps also designed to be arranged around the hood for holding the same in collapsed condition.

In testimony whereof I affix my signature.

CHARLES W. SMITH.